United States Patent [19]
Pope et al.

[11] Patent Number: 5,311,734
[45] Date of Patent: May 17, 1994

[54] SYSTEM AND METHOD FOR IMPROVED ENGINE COOLING IN CONJUNCTION WITH AN IMPROVED GAS BEARING FACE SEAL ASSEMBLY

[75] Inventors: Adam N. Pope, Cincinnati; Ming-Fong Hwang, West Chester, both of Ohio

[73] Assignee: General Electric Company, Cincinnati, Ohio

[21] Appl. No.: 332

[22] Filed: Jan. 4, 1993

Related U.S. Application Data

[63] Continuation-in-part of Ser. No. 757,777, Feb. 27, 1991, abandoned.

[51] Int. Cl.[5] .......................... F02C 7/18; F02C 7/28
[52] U.S. Cl. .................. 60/39.02; 60/39.75; 415/173.7
[58] Field of Search .............. 60/39.02, 39.07, 39.75; 415/115, 173.7, 174.3

[56] References Cited

U.S. PATENT DOCUMENTS

| | | | |
|---|---|---|---|
| 3,383,033 | 5/1968 | Moore | 415/111 |
| 3,989,410 | 11/1976 | Ferrari | 415/114 |
| 4,265,590 | 5/1981 | Davies | 415/110 |
| 4,318,668 | 3/1982 | Chaplin et al. | 415/135 |
| 4,332,133 | 6/1982 | Schwarz et al. | 60/39.75 |
| 4,351,532 | 9/1982 | Laverty | 277/53 |
| 4,375,891 | 3/1983 | Pask | 277/3 |
| 4,466,239 | 8/1984 | Napoli et al. | 415/173.7 |
| 4,561,246 | 12/1985 | Hovan | 415/173.7 |
| 4,653,267 | 3/1987 | Brodell et al. | 60/39.07 |
| 4,815,272 | 3/1989 | Laurello | 60/39.75 |
| 4,901,520 | 2/1990 | Kozak | 60/39.02 |

FOREIGN PATENT DOCUMENTS

| | | |
|---|---|---|
| 0206683 | 12/1986 | European Pat. Off. |
| 768041 | 5/1955 | Fed. Rep. of Germany |
| 2235019 | 2/1991 | United Kingdom |
| 2237068 | 4/1991 | United Kingdom |

*Primary Examiner*—Louis J. Casaregola
*Attorney, Agent, or Firm*—John R. Rafter; Jerome C. Squillaro

[57] ABSTRACT

A method and system for cooling a gas turbine engine in conjunction with an improved gas bearing face seal assembly. The gas turbine engine has a multi-stage compressor which discharges compressor discharge air for expansion by a combustor. A cavity which is aerodynamically linked to a turbine stage on its downstream end is formed by a metal structure the upstream end of which is connected to a seal which substantially inhibits the flow of compressor discharge air into the cavity. A conduit links an intermediate stage of the multi-stage compressor to the cavity for purposes of cooling the cavity and the turbine stage components located downstream of the cavity.

5 Claims, 5 Drawing Sheets

SYSTEM AND METHOD FOR IMPROVED ENGINE COOLING IN CONJUNCTION WITH AN IMPROVED GAS BEARING FACE SEAL ASSEMBLY

CROSS-REFERENCES

This application is a continuation-in-part of U.S. patent application Ser. No. 07/757,777 for a SYSTEM AND METHOD FOR IMPROVED ENGINE COOLING, filed on Feb. 27, 1991 (abandoned). Reference is also made to the following related commonly assigned and co-pending applications filed concurrently herewith and herein incorporated by reference having U.S. application Ser. No. 07/757,774 for a HYDRO-LIFT DYNAMIC CIRCUMFERENTIAL SEAL and U.S. application Ser. No. 07/767,959 FOR AN EFFECTIVE SEALING DEVICE FOR AN ENGINE FLOW PATH.

BACKGROUND OF THE INVENTION

1. Field of the Invention

The present invention relates to cooling systems for gas turbine engines. More particularly, the present invention pertains to a method and system for cooling an engine by utilizing air from the intermediate stage of a compressor to cool a flow path adjacent a combustor stage leading to a turbine stage. An improved seal prevents substantial leakage of compressor discharge (CD) air from entering the flow path. Since the air supplied by the intermediate stage compressor is at a lower temperature than CD air, less volume is needed for the same degree of cooling. Furthermore, since less work is performed on the air supplied by the intermediate stage compressor, fuel efficiency is improved and fuel consumption reduced.

2. Discussion of the Background

Air leakage through gas turbine engine seals may significantly increase fuel consumption, reduce engine efficiency and increase maintenance costs by increasing turbine inlet temperatures. Gas turbine engines have traditionally included labyrinth seals at critical sealing locations. Labyrinth seals control the leakage of high pressure gas, such as compressor discharge air, from a generally high pressure area to a generally low pressure area. The seals operate by throttling gas flow through a series of annular constrictions formed between annular teeth, which may be located on a rotating component, and an annular rub strip which may be located on a stationary engine member. The rub strips are abradable to allow the teeth to rub lightly during dynamic operating conditions, such as thermal transients or maneuver loads. The effectiveness of these labyrinth seals is dependent on keeping the radial clearance between the rub strip and teeth to a minimum.

However, the minimum radial clearance is limited by manufacturing tolerances, rotor concentricity control, and thermal and centrifugal growths between rotating and stationary components. Too small a radial clearance results in premature seal wear and possible engine damage, while too large a radial clearance results in excess leakage. As seal diameters and gas temperatures increase in advanced engines, the radial clearance of labyrinth seals has increased, thereby diminishing their effectiveness.

Gas bearing face seals provide an alternative to the labyrinth seal. U.S. Pat. No. 3,383,033 issued to C. Moore and assigned to the assignee of the present invention discloses a gas bearing face seal for use as a compressor discharge seal. Although the seal as disclosed may be an improvement over the labyrinth seal, the disclosed seal includes a number of potential disadvantages. For example, the disclosed seal does not include means for maintaining the seal concentric with respect to the axis of the engine or with other seal components. Test analysis has demonstrated that concentricity of a ring seal with respect to other seal components is important for good seal operation. Concentricity helps maintain concentric, balanced pressure forces on the seal components and promotes good sealing characteristics while allowing for the use of smaller, more lightweight seal components.

The seal disclosed in U.S. Pat. No. 3,383,033 uses a relatively massive ring member and therefore possesses a high mass inertia. Ideally, the ring member should have a low mass inertia and have a relatively high compliance for reduced seal weight and, more importantly, reduced hysteresis in the axial clearance between the radial sealing surface and the face of the rotor. A low mass inertia ring member can more quickly and efficiently track motion of the sealing surface with lower actuating forces.

It is also believed that the seal disclosed in U.S. Pat. No. 3,383,033 may include a propensity for the clearance between the seal and face of the rotating seal ring member to vary according to thermal growth and other factors causing changes in pressure forces and poor sealing. Also, the disclosed seal includes an auxiliary restrictor tooth which is integral with or mounted on the ring member which adds weight to the ring member requiring heavy spring means to be used to bias the ring member away from the sealing surface. Furthermore, it is believed that the disclosed seal does not efficiently vent air exiting the air bearing space and the restrictor tooth to the low pressure region. Improved venting is desired to assure proper pressure balance on the ring member.

The above disadvantages of the seal disclosed in U.S. Pat. No. 3,383,033 are addressed in the U.S. patent application entitled "Gas Bearing Sealing Means", filed Mar. 25, 1991, having U.S. Ser. No. 07/675,977, hereinafter referred to as the "'977 application" which is assigned to the assignee of the present invention, herein incorporated by reference in its entirety. For purposes of this application, the "Gas Bearing Sealing Means" disclosed in the application filed on Mar. 25, 1991 shall hereinafter be referred to as the "improved gas bearing seal".

The improved gas bearing seal maintains a concentric relationship between gas bearing face seal components to establish concentric pressure forces on the components. The improved gas bearing seal has a face seal ring member which is pressurized preferably in the radially outward direction in order to maintain ring shape. The improved gas bearing seal has a reduced mass inertia face seal member for reducing sealing clearance hysteresis. The improved gas bearing seal has means for maintaining a pressure balance even when the engine stationary structure is exposed to differential growth. Furthermore, the improved gas bearing face seal requires less tension in the spring means which biases the face seal member away from the sealing surface and achieves improved flow from a gas bearing face surface and a primary flow restrictor means.

The above features of the improved gas bearing seal are achieved by a seal assembly for restricting flow from a relatively higher pressure region to a relatively lower pressure region at a location which interfaces an engine stationary member and an engine rotating member. The seal assembly of the improved gas bearing seal includes the following, as noted in '977 application: a face seal ring member with a primary restrictor sealing dam, housing means including a housing structure fixed to an engine stationary structure, and a secondary seal means, which may be a piston ring seal, in sealing engagement with the housing means and the face seal ring member. The face seal ring member is mounted on the housing for movement of the primary sealing dam into a predetermined clearance with a primary sealing surface on the rotating engine member.

The assembly includes support means for supporting the face seal ring member concentrically with respect to a housing surface to maintain concentric sealing forces on seal components, while permitting radial growth between the face seal ring member and a housing structure. Control ring means concentrically positioned on the housing structure may be used in high temperature applications to maintain pressure balance on seal components during differential growth of the housing structure with respect to the face seal ring member. The seal assembly may be configured to utilize the high pressure region being sealed to pressurize the ring member radially outward, for maintaining ring roundness. Auxiliary restricting teeth can be mounted on a structure separate from the face seal member, the teeth being concentric with respect to a face seal member surface and a surface on the engine rotating member. Venting of the gas bearing space and primary restrictor flow is improved by including a vent channel turning vane and circumferentially angled vent passages to reduce the pressure drop from the vent channel to the low pressure region.

The improved gas bearing seal significantly reduces leakage of compressor discharge air so that more compressor discharge air is utilized by the combustor. The improved gas bearing seal also significantly reduces the temperature rise of the air that leaks through the seal. However, the superior sealing properties of the improved gas bearing seal do not allow enough air to leak through to a flow path which comprises a cavity formed by a metal structure so the air can be used to cool the metal structure and the turbine blades which are aerodynamically connected to the flow path. Thus, a need is seen for a method and assembly which can utilize the effective sealing properties of the improved gas bearing seal on compressor discharge air while providing adequate or improved cooling for the engine.

SUMMARY OF THE INVENTION

Accordingly, one object of the present invention is to provide an improved method and system for purposes of cooling a gas turbine engine which utilizes a separate plumbing system for piping air from a compressor stage to a cavity for purposes of cooling the cavity.

Another object of the present invention is to increase hardware life in a gas turbine engine.

Yet another object of the present invention is to reduce the amount of mass flow needed for cooling purposes and to realize improved engine efficiency and fuel savings.

These and other valuable objects and advantages are provided by a system and method according to the present invention for cooling a gas turbine engine. The gas turbine engine has a multi-stage compressor which discharges compressor discharge air which is then expanded by a combustor. A sealing means allows only a small portion of the compressor discharge air to enter a cavity which is formed by a metal structure. Therefore, more discharge air is utilized by the combustor. The cavity is aerodynamically linked to a turbine stage of the gas turbine engine. An intermediate stage of the multi-stage compressor is connected to a conduit which leads from the intermediate stage of the multi-stage compressor to the cavity, the conduit aerodynamically connecting the intermediate stage of the multi-stage compressor with the cavity. Intermediate stage air is thus allowed to flow from the intermediate stage to the cavity for the purpose of cooling the cavity and the turbine components located downstream of the cavity. The intermediate air is substantially cooler than the compressor discharge air, with the multi-stage compressor having performed less work on the intermediate stage air than on the compressor discharge air so that efficiency is improved and less air flow is required since the intermediate stage air is at a lower temperature than the compressor discharge air.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings wherein.

When referring to the drawings, it is understood that like reference numerals in the figures of the present application, designate identical or corresponding parts throughout the respective figures.

THE DETAILED DESCRIPTION OF THE INVENTION

Figure 1:
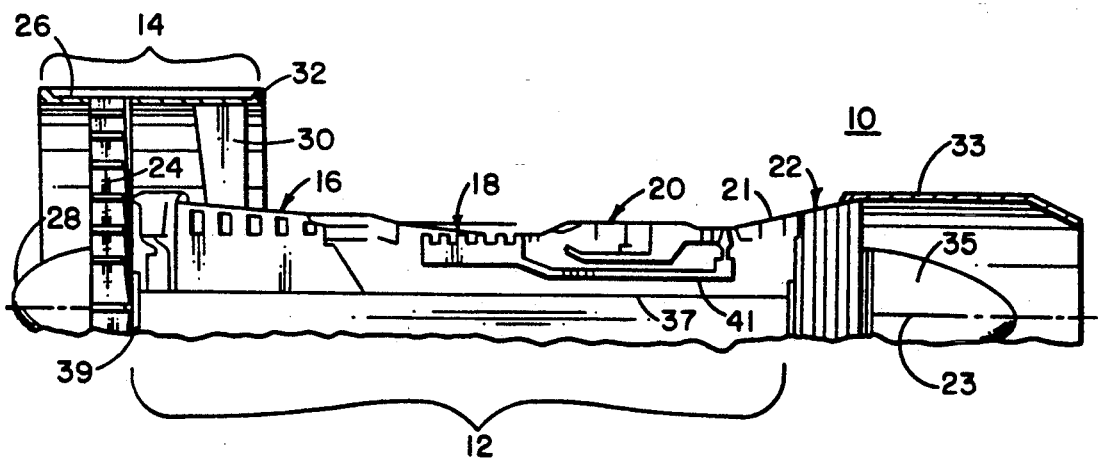
FIG. 1 is a simplified, partial cross-sectional view of an exemplary gas turbine engine illustrative of the location of the primary sections of the engine.

With reference to FIG. 1, there is shown a simplified schematic representation of a portion of a prior art gas turbine engine 10. The gas turbine engine 10 has a core engine portion indicated at 12 and a fan portion indicated at 14. The core engine or core engine portion 12 includes an intermediate pressure compressor or booster stage 16, a high pressure compressor stage 18, a combustor stage 20, a high pressure turbine stage 21, and a low pressure turbine stage 22 all aligned on an engine centerline 23. The fan portion 14 includes a plurality of fan blades 24, a fan shroud 26, a fan spinner 28, and a plurality of circumferentially spaced outlet guide vanes 30 which supports the fan shroud 26. The vanes 30 are attached to engine casing 32 adjacent the booster stage 16. The engine 10 also includes an aft core cowl 33 and a primary nozzle 35. A fan shaft 37 driven by turbine stage 22 extends through the engine and is coupled in driving relationship with booster stage 16 and fan blades 24 via a fan rotor 39. The high pressure turbine stage 21 drives the compressor stage 18 through a high pressure shaft 41.

Figure 2:
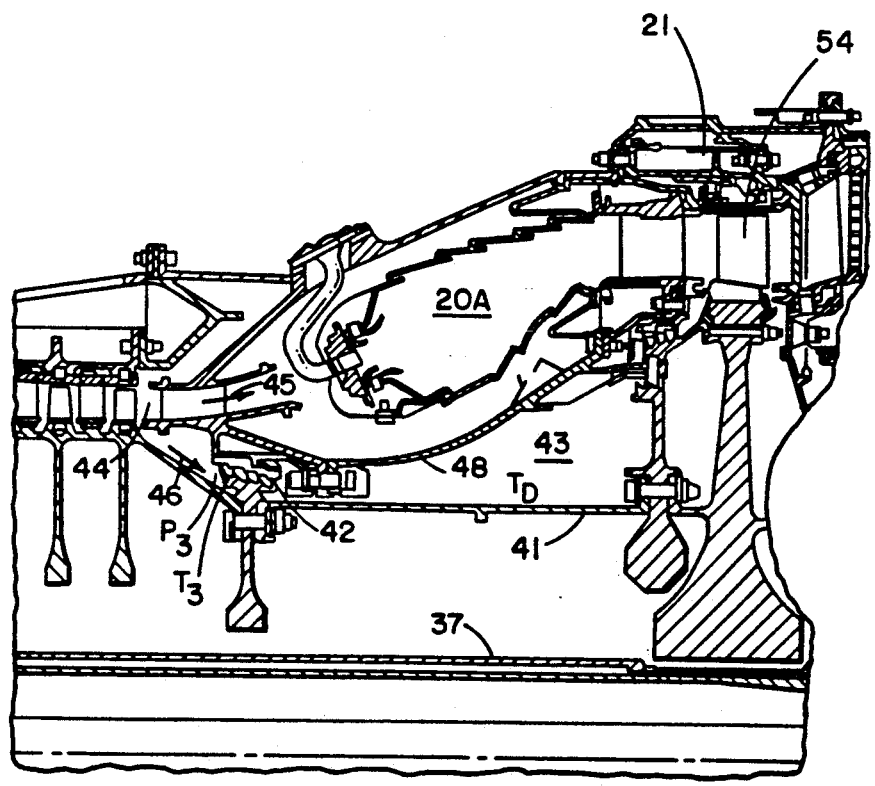
FIG. 2 is a simplified, cross-sectional schematic illustration of a portion of a combustor area cooling system for a gas turbine engine which includes a labyrinth seal.

FIG. 2 is a more detailed schematic representation of that portion of the engine of FIG. 1 including part of the high pressure compressor stage 18, the combustor stage 20, and the high pressure turbine stage 21. The high pressure air (compressor discharge air) exiting the compressor stage at location 44 is dissected into the combustor stage 20 and is mixed with fuel and ignited in combustor 20A. The burning of this fuel/air mixture creates extremely high temperatures within and about the combustor. The combustor 20A and its surrounding structure are generally formed in an annular configuration with the shafts 37 and 41 extending through a centrally formed space in the combustor stage 20. Various structures associated with shafts 37 and 41 are located within this space. It is desirable to have some flow of cooling air over this support structure to at least partially reduce the operating temperatures of the support structure.

The compressor discharge air is typically at an elevated temperature due to the work done on the air by the compressor stages 16 and 18, although at a much lower temperature than the hot gases exiting the combustor stage 20. The hot gases which exit the combustor 20A are used to turn a plurality of staged turbine blades such as turbine blade 54.

A cavity 43 is formed by a metal structure 48, located radially inward of combustor 20A, and shaft 41. Cooling air for the support structure within cavity 43 has generally been obtained by leakage from the compressor discharge air through a labyrinth seal 42 adjacent compressor discharge outlet 44 and combustor stage inlet 45. As a result of its location, labyrinth seal 42 is generally referred to as a CDP (compressor discharge pressure) seal. Labyrinth seal 42 controls the leakage of compressor discharge air 46, with the pressure of the discharge air being indicated by $P_3$ and the temperature of the discharge air being indicated by $T_3$. The pressure on the upstream side of labyrinth seal 42 is greater than the pressure on the downstream side of labyrinth seal 42. The portion of compressor discharge air 46 which is not directed to the combustor 20 is throttled through a series of annular restrictions formed radially by a series of rotating labyrinth teeth and a corresponding stationary rub strip of labyrinth seal 42. Wear on the knife edge of the labyrinth teeth and on the corresponding rub strip severely limits the ability of labyrinth seals to maintain a small clearance which results in excess leakage.

As described above, the prior art engine system of FIG. 2 utilizes the excess leakage of compressor discharge air 46 into cavity 43 for cooling purposes. Cavity 43, defined radially outwardly by stationary combustor stage 48 and radially inwardly by rotating shaft 41, is prone to experience a rise in temperature as a result of rotating windage downstream of compressor discharge outlet 44. To maintain the stationary metal structure 48 of the combustor stage 20 at an acceptable temperature, the CD air 46 which leaks through labyrinth seal 42 into cavity 43 flows over and cools the metal structure 48 as well as the rotating structures such as shaft 41. The temperature $T_D$ in cavity 43 is equal to $T_3 + {}_{66}T$, where $_\Delta T$ is equal to the temperature rise across the labyrinth seal 42 resulting from rotating windage. Thus, the leaky properties of labyrinth seal 42 have been taken into account for purposes of cooling.

CDP seals are usually classified as "critical" seals since the leakage of compressor discharge air is expensive in terms of its effects on engine performance. Excessive leakage significantly increases the life cycle costs of an engine by increasing turbine inlet temperature, reducing thrust, and/or increasing fuel consumption. Furthermore, as the labyrinth seal deteriorates through use, the leakage becomes much greater than is necessitated for cooling requirements, further decreasing system efficiency.

Figure 3:
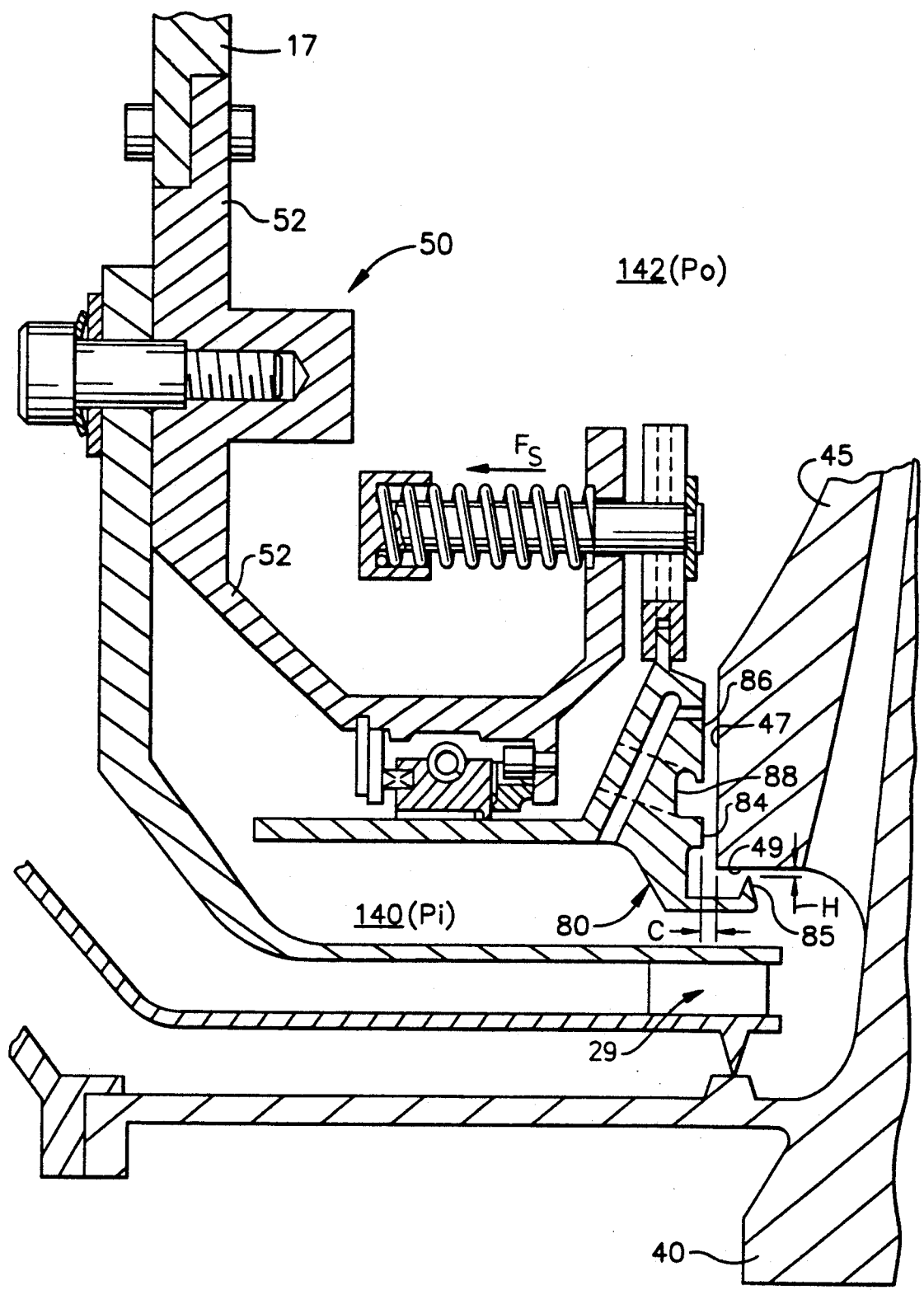
FIG. 3 is a schematic illustration of a cross-sectional view of a gas bearing face seal assembly in accordance with the type of seal assembly utilized in a preferred embodiment of the present invention, shown in an open, or retracted position.
Figure 4:
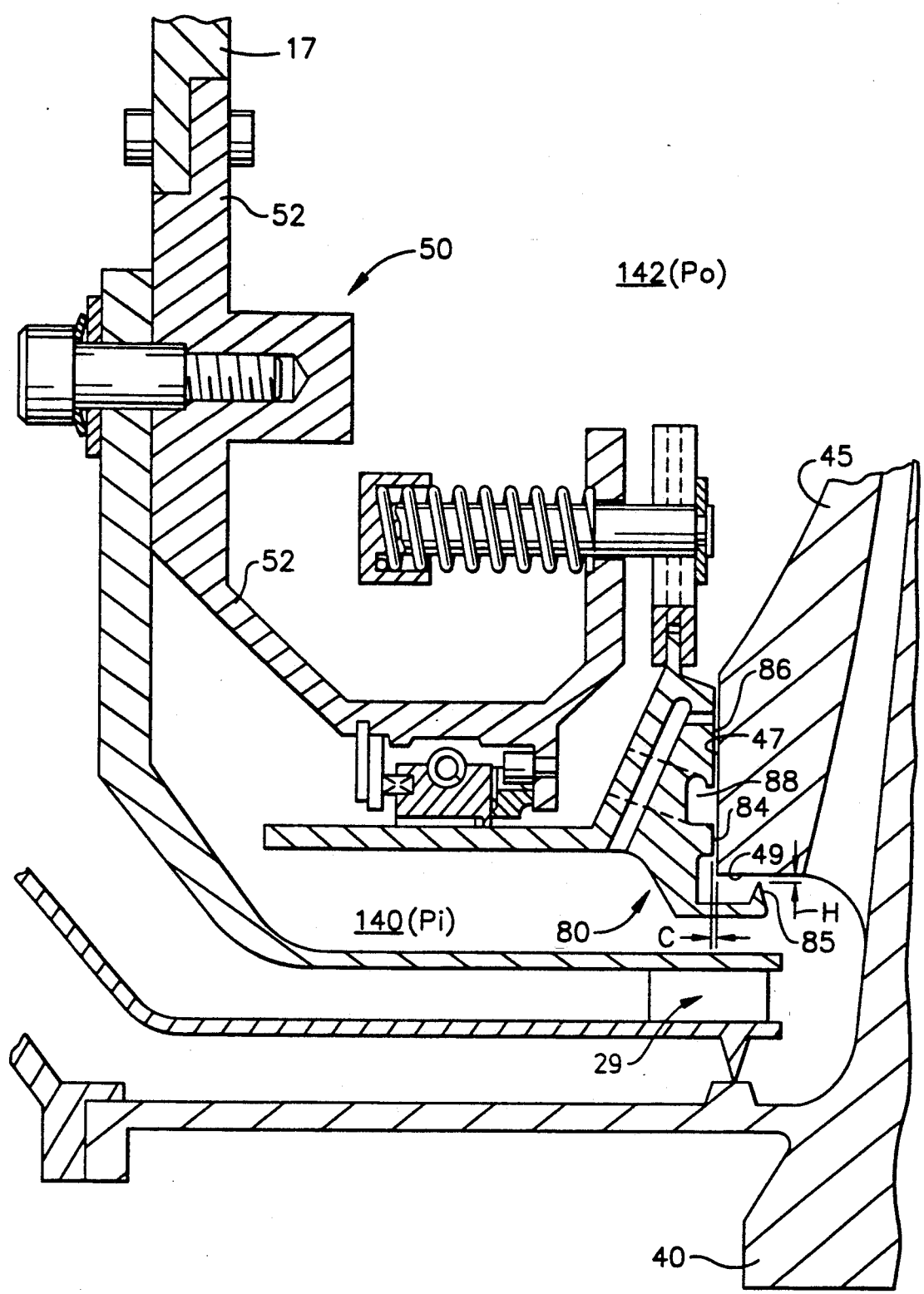
FIG. 4 is a schematic illustration of a cross-sectional view of a gas bearing face seal assembly in accordance with the type of seal assembly utilized in a preferred embodiment of the present invention, shown in a closed, or sealing position.

FIGS. 3 and 4 show an embodiment of the improved gas bearing face seal of the present invention serving as the turbine inducer seal. The seal assembly includes housing means 50, which can include a housing structure 52 fixed with respect to engine stationary structure 17. A face seal means, such as a face seal ring member 80, which is preferably a circumferentially continuous ring structure, is movably supported on housing structure 52. Face seal ring member 80 is supported for movement with respect to a primary rotating sealing surface 47 on a rotating member 45, which may be attached to or integral with rotor 40. Face seal means 80 includes a primary flow restrictor means, such as a primary restrictor dam 84, and a gas bearing face surface 86 radially spaced apart from restrictor 84 by a circumferentially extending vent channel 88. Flow restrictor dam 84 is a radially and circumferentially extending surface, and is more effective in restricting flow than a circumferentially extending labyrinth tooth. Motion of face seal ring member 80 with respect to primary sealing surface 47 defines a primary gas bearing face clearance, C, separating primary flow restrictor 84 and gas bearing face surface 86 from primary sealing surface 47 on rotating member 45. An auxiliary clearance H can be defined between an auxiliary restrictor tooth 85 on face seal means 80, and an auxiliary seal surface 49 on rotating member 45. Drawing dimensions such as clearance C and H are not to scale.

In the retracted position, clearance C can be an order of magnitude greater than clearance H. In a sealing position, clearance C is about 0.0005 to 0.0025 inch, and may be an order of magnitude smaller than clearance H. Clearance H remains relatively constant.

Figure 5:
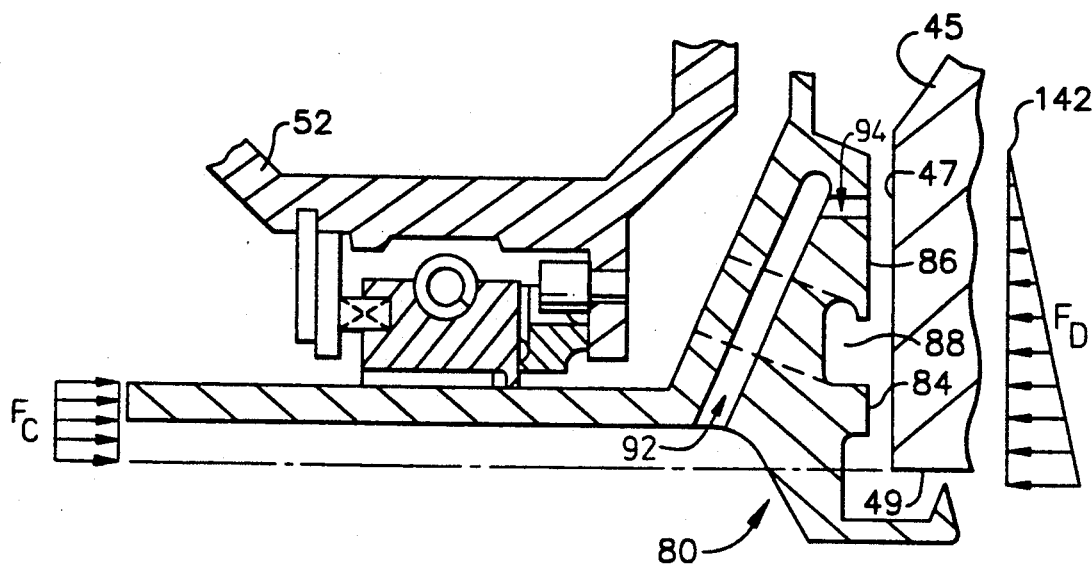
FIG. 5 is a schematic illustration of a partial cross-sectional view of the assembly of FIG. 3, showing forces acting on a face seal ring member in a retracted position.
Figure 6:
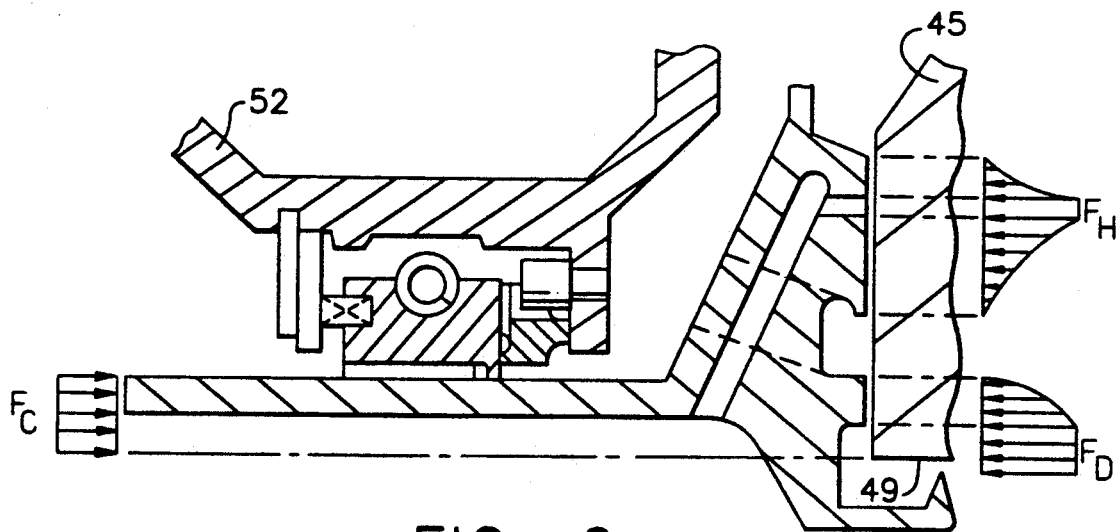
FIG. 6 is a schematic illustration of a partial cross-sectional view of the assembly of FIG. 4, showing forces acting on a face seal ring member in a sealing position.

FIG. 3 shows the face seal ring in a retracted position, and FIG. 5 shows the forces acting on the face seal ring in the retracted position. Likewise, FIG. 4 shows the face seal ring in a sealing position, and FIG. 6 shows the forces acting on the face seal ring in the sealing position. The forces shown in FIGS. 5 and 6 are shown as resultants of pressures acting on surfaces. The pressures are represented as arrows, where the direction of the arrows indicates the direction of action of the pressure, and where the length of the arrows indicates the magnitude of the pressure. Po, a gage or reference pressure, represents a relatively lower pressure in area 142, and Pi represents a relatively higher pressure in area 140''. The improved gas bearing face seal assembly of the present invention is used to restrict fluid flow leakage, of high pressure compressor discharge air, from the relatively high pressure region 140 to the relatively low pressure region 142 at the juncture between the engine rotating member 40 and the engine stationary structure 17, which may support the inducer 29.

Although the improved gas bearing face seal of '977 application is described as a turbine inducer seal, it can also be adapted to provide a compressor discharge seal, as in the present application, or a pressure balance seal in a gas turbine engine. Unlike the labyrinth seal of FIG. 2, an improved gas bearing seal 56 (shown in FIG. 7) such as that disclosed in FIGS. 3-6 drastically reduces the flow rate of compressor discharge air 46 into cavity 43. Tests of a gas bearing face seal incorporating the advantages of the present invention were carried out for comparison with a comparable four tooth labyrinth seal design. The primary restrictor dam was located on a 15 inch diameter with respect to the axis of rotation of the rotating member, with a 0.0015 inch primary restrictor clearance C. The test ran 230 hours at 5000 rpm (330 feet per second primary sealing surface speed on the rotating member) at 950 degrees Fahrenheit and 85 psi pressure differential. The leakage rate was 0.165 lbm/sec, representing an eighty percent reduction over the comparable labyrinth seal design having a 15 inch diameter. A ninety percent reduction is predicted for a larger, 37 inch diameter seal.

One advantage of the seal assembly shown in FIGS. 3 and 4, and consequently of the improved gas bearing seal 56 of the present application, over the known gas bearing face assembly, is that the net radial pressure force on face seal ring 80 due to the pressure differential between Pi and Po acts radially outwardly to better maintain roundness of ring 80 for a given ring mass. A lightweight ring 80 can better track axial motion of rotating surface 46 with reduced hysteresis in clearance C.

Figure 7:
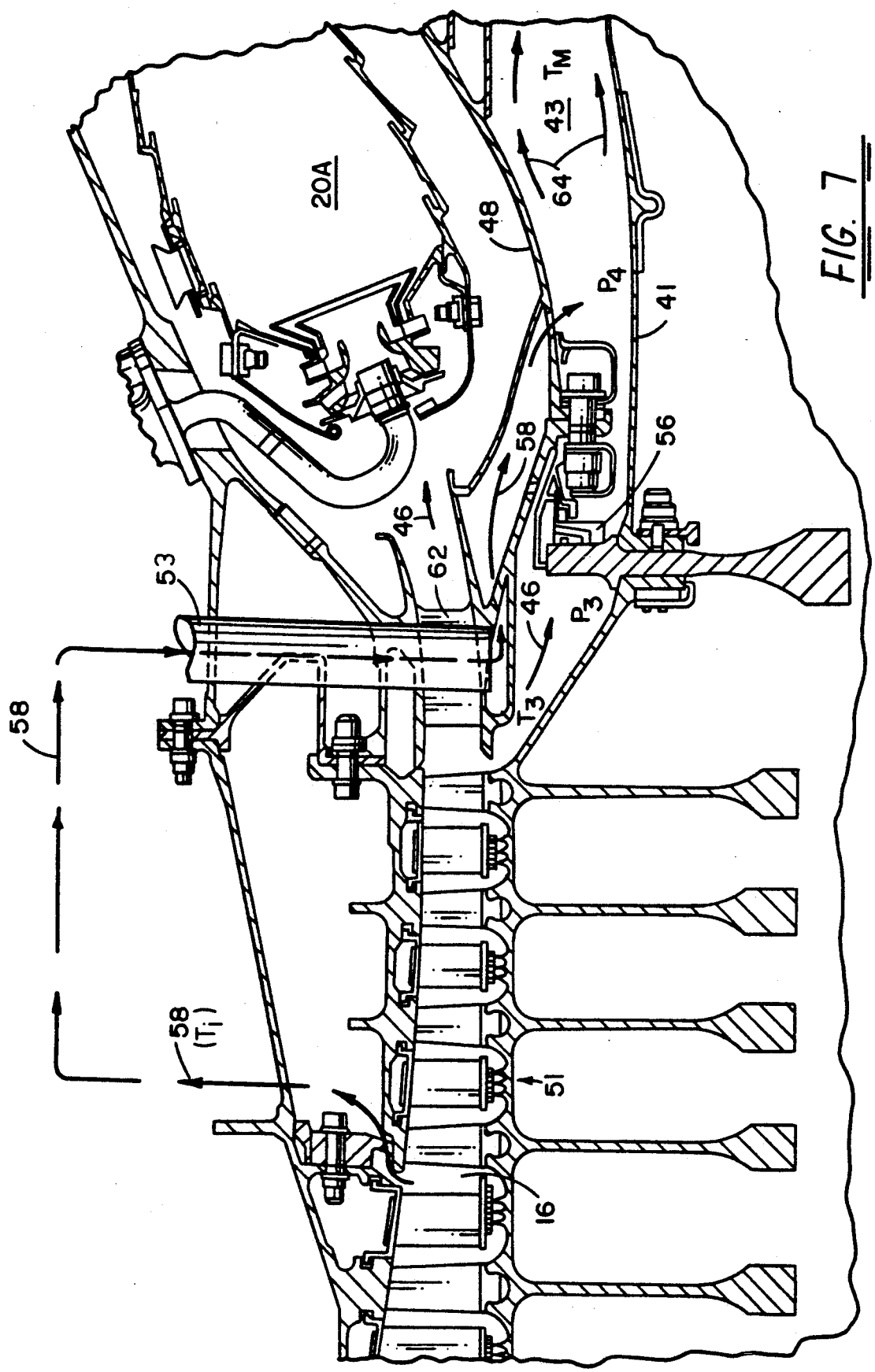
FIG. 7 is a simplified, cross-sectional schematic illustration of the improved combustor area cooling system for a gas turbine engine according to the present invention.

In FIG. 7, a simplified schematic illustration of the cooling system of the present invention depicts cooling air extraction from an axially forward stage of multi-stage compressor 51 through a conduit 53. Conduit 53 channels air from the forward stage of multi-stage compressor 51 to the cavity 43.

Preferably, the improved engine cooling system of the present invention (FIG. 7), replaces the labyrinth seal of FIG. 2 with the improved gas bearing seal 56. Alternatively, a low leakage labyrinth seal may be used or other type of sealing device which significantly reduces CDP leakage. The pressure $P_3$ on the upstream side of the gas bearing seal 56 is, of course, greater than the pressure $P_4$ located in cavity 43 on the downstream side of the seal 56. The improved gas bearing seal 56, is believed to reduce leakage by up to 80% and reduce temperature rise of leakage by up to 80% over the labyrinth seal 42 when used in commercial aircraft gas turbine engines.

In operation, gas bearing forces act on the improved gas bearing seal 56 to control clearance C as follows. "As the engine is started and the compressor discharge pressure rises, pressure Pi in area 140 begins to rise. Referring to FIG. 5, the pressure differential between Pi and Po results in a closing force Fc acting on face seal ring 80. Force Fc acts against spring force Fs (FIG. 3) to urge face seal ring 80 and primary restrictor dam 84 toward surface 47. Radially outwardly extending feed passages 92 in face seal 80 intersect with axially extending orifice bores 94 to communicate pressure Pi into primary clearance C between gas bearing face 86 and surface 47. However, because clearance C is much larger than clearance H, almost the entire pressure drop between Pi and Po occurs across auxiliary clearance H (FIG. 3). Therefore, only a pressure force Fd is established on surfaces 84 and 86 to act, with Fs, to resist motion of primary restrictor 84 toward surface 47. In this mode Fc is greater than Fs plus Fd, so that ring 80 moves toward surface 47.

As face seal ring 80 reaches the sealing position shown in FIG. 6, clearance C becomes much smaller than clearance H, as described above. As a result, the pressure drop across auxiliary tooth 85 is insignificant, and the pressure drop from Pi to Po occurs substantially across clearance C between primary restrictor 84 and surface 47. Thus, gas bearing forces Fh and Fd are developed at surfaces 86 and 84 respectively which, acting with Fs, balance closing force Fc and maintain clearance C at a predetermined size, such as between 0.0005 and 0.0025 inches. The sealing position is a stable equilibrium position: relative motion of face seal ring 80 away from surface 47 will decrease force Fh so that there is a net force urging ring 80 toward surface 47, while relative motion of ring 80 toward surface 47 will increase force Fh and urge ring 80 away from surface 47."

As a result of reduced leakage resulting from the improved gas bearing seal 56, another source of air is needed for purge flow to cool the temperature of the cavity 43. This additional purge flow is provided by the axially forward stage of compressor 51. The extracted intermediate stage air 58 having a temperature $T_i$ is directed through conduit 53 extending from the forward stage through strut 62 and into cavity 43. The axially forward stage corresponds to the sixth or seventh stage of a compressor in a type CFM-56 engine, or stages 8 to 11 in a type CF-6 engine.

The air in cavity 43 indicated by arrows 64 (FIG. 7) is a mixture of the intermediate stage air 58 and a small quantity of CD air 46. Approximately 80% of the air in the cavity 43 originates from the intermediate stage with the remainder originating from the CD air 46 which leaks through the improved gas bearing seal 56.

An advantage of using the intermediate stage air 58 for cooling is that the intermediate stage air is much "cheaper" than CD air because less work has been performed on the intermediate stage air by the compressor. Furthermore, since the intermediate stage air 58 is much cooler than the CD air 46 ($T_i < < T_3$), less flow is required.

As a result of the cooling system of the present invention, the cavity flow temperature $T_m$, which is a mixture of the CDP seal leakage air (CD air 46) and the purge flow air (intermediate stage air 58), is lower than the temperature $T_D$ of FIG. 2. Lower temperature offers more effective cooling and results in less mass flow being required. In addition, the major portion of the mass flow for the improved engine cooling system of the present invention consists of cheaper intermediate stage compressor air. Thus, fuel consumption is improved, metal temperatures reduced and turbine life increased.

The foregoing detailed description is intended to be illustrative and non-limiting. Many changes and modifications are possible in light of the above teachings. Thus, it is understood that the invention may be practiced otherwise than as specifically described herein and still be within the scope of the appended claims.

What is claimed is:

1. A method for improving efficiency of a gas turbine engine by reducing cooling air requirements, the gas turbine engine having a combustor and a multi-stage air compressor having at least an intermediate pressure stage and a high pressure compressor discharge stage, discharge air being directed into the combustor, a cavity defined at least adjacent one surface of the combustor for reducing heat transfer to adjacent structures by air flow through the cavity, a conduit coupled from the intermediate pressure stage to the cavity, a rotor structure supported generally centrally of said combustor and spaced therefrom, wherein said rotor structure forms a portion of said cavity and includes a rotating member having a primary rotating sealing surface, the gas turbine engine further including a gas bearing face seal assembly connected between said rotor structure and said combustor structure, said gas bearing face seal assembly including a face seal ring member having a primary flow restrictor dam and a gas bearing surface, said seal assembly further including means for movably supporting said face seal ring member on said combustor structure, said method comprising the steps of:
   a) extracting a preselected flow of air from the intermediate stage of the multi-stage compressor via the conduit;
   b) subjecting the structure in the cavity to the flow of air from the intermediate compressor stage; and
   c) substantially inhibiting the flow of air from the compressor discharge stage into the cavity, wherein the step of substantially inhibiting comprises the steps of
      i) forming a primary gas bearing face clearance between said primary rotating sealing surface and each of said primary flow restrictor dam and said gas bearing surface, and
      ii) utilizing gas bearing forces to maintain said clearance at a predetermined size.

2. A method according to claim 1 wherein at least some of the compressor discharge air leaks into the cavity, the step of subjecting including the step of mixing the CDP air with the preselected flow of air from the intermediate compressor stage.

3. A method according to claim 2, wherein said gas bearing face seal assembly separates a relatively higher fluid pressure region and a relatively lower fluid pressure region, and wherein the step of substantially inhibiting further comprises the step of pressurizing said face seal ring member due to a pressure differential between the higher fluid pressure region and the lower fluid pressure region to maintain a roundness of said face seal ring member.

4. A gas turbine engine comprising:
   a) a multi-stage air compressor having a compressor discharge stage and at least one lower pressure stage;
   b) an annular combustor structure having air inlet means coupled for receiving air from said compressor discharge stage;
   c) a rotor structure supported generally centrally of said combustor and spaced therefrom whereby an annular cavity is defined between said rotor structure and said combustor structure;
   d) sealing means connected between said rotor structure and said combustor structure adjacent said air inlet means for inhibiting compressor discharge air from entering said cavity;
   e) means for extracting a preselected flow of air from said lower pressure stage of said compressor and for directing said extracted air onto said rotor structure;
   f) wherein said sealing means comprises a gas bearing face seal assembly, said gas bearing face seal assembly comprising
      i) a face seal ring member including
         A) a primary flow restrictor dam, said dam being a radially and circumferentially extending surface, and
         B) a gas bearing face surface, and
      ii) means for supporting said face seal ring member on said combustor structure for translation of said primary flow restrictor dam and said gas bearing face surface relative to a primary rotating sealing surface on a rotating member which comprises a portion of said rotating structure to establish an axially and circumferentially extending primary gas bearing face clearance between said primary rotating sealing surface and each of said primary flow restrictor dam and said gas bearing face surface.

5. The gas turbine engine of claim 4, wherein said gas bearing face seal assembly restricts fluid flow from a relatively higher pressure region to a relatively lower pressure region at a juncture of said combustor structure and said rotating member and wherein said face seal ring member is pressurized radially outwardly or inwardly due to a pressure differential between the higher pressure region and the lower pressure region to maintain a roundness of said face seal ring member.

* * * * *